(12) United States Patent
Strunk

(10) Patent No.: US 9,604,862 B2
(45) Date of Patent: Mar. 28, 2017

(54) OXIDATION METHOD, NOZZLE AND SYSTEM FOR TREATING WASTE WATER

(71) Applicant: Sven Strunk, Ebnat-Kappel (CH)

(72) Inventor: Sven Strunk, Ebnat-Kappel (CH)

(*) Notice: Subject to any disclaimer, the term of this patent is extended or adjusted under 35 U.S.C. 154(b) by 191 days.

(21) Appl. No.: 14/364,828

(22) PCT Filed: Dec. 14, 2012

(86) PCT No.: PCT/EP2012/005172
§ 371 (c)(1),
(2) Date: Jun. 12, 2014

(87) PCT Pub. No.: WO2013/087219
PCT Pub. Date: Jun. 20, 2013

(65) Prior Publication Data
US 2014/0353259 A1    Dec. 4, 2014

(30) Foreign Application Priority Data
Dec. 16, 2011    (DE) .................. 10 2011 121 193

(51) Int. Cl.
*B01F 3/04*    (2006.01)
*B01F 3/08*    (2006.01)
(Continued)

(52) U.S. Cl.
CPC ............ *C02F 1/725* (2013.01); *B01F 3/0451* (2013.01); *B01F 3/0876* (2013.01);
(Continued)

(58) Field of Classification Search
CPC ...... B01F 5/106; B01F 5/0206; B01F 5/0405; B01F 5/0082; B01F 5/0428; B01F 3/0451;
(Continued)

(56) References Cited

U.S. PATENT DOCUMENTS

| | | | |
|---|---|---|---|
| 4,474,477 A | 10/1984 | Smith et al. | 366/165.5 |
| 4,809,911 A | 3/1989 | Ryan | 239/9 |

(Continued)

FOREIGN PATENT DOCUMENTS

| | | |
|---|---|---|
| AT | 338731 | 3/1974 |
| DE | 4314521 A1 | 11/1994 |

(Continued)

OTHER PUBLICATIONS

International Search Report in PCT/EP12/005172, Apr. 3, 2013, PCT.

(Continued)

*Primary Examiner* — Lucas Stelling
(74) *Attorney, Agent, or Firm* — Licata & Tyrrell P.C.

(57) ABSTRACT

The present invention relates to a device, particularly a nozzle, for treating waste water, said nozzle having an outer tube and an inner tube. An intermediate space is formed between the outer tube and the inner tube and said intermediate space between the outer tube and the inner tube is divided into at least two chambers in the longitudinal direction of the tubes. The inner tube tapers in the longitudinal direction and then widens again and has at least one opening into each chamber at the constricted area. On the inner side of the inner tube and/or in the interior thereof, the device preferably has a catalyst. The present invention further relates to a method for oxidizing polluted waste water and a system for performing the method.

12 Claims, 3 Drawing Sheets

Figure 1:
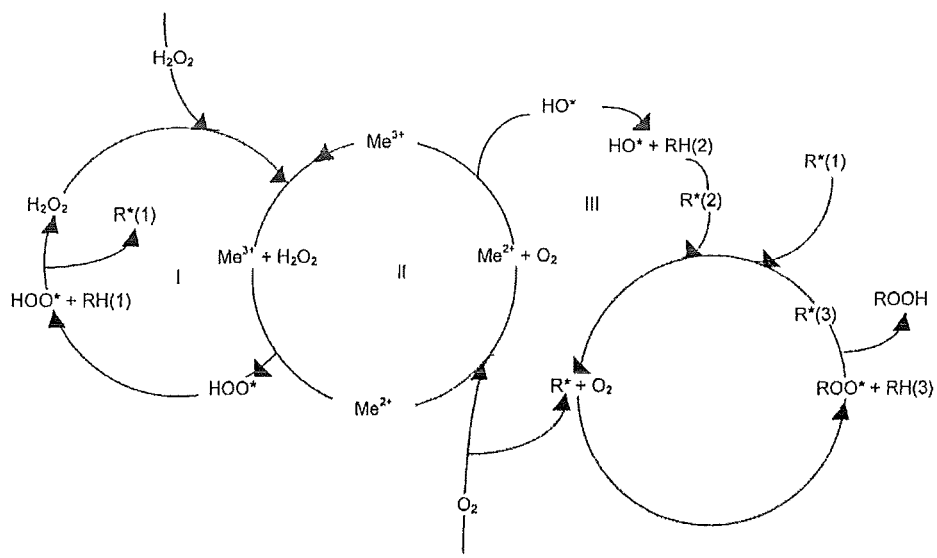

(51) Int. Cl.
*B01F 5/00* (2006.01)
*B01F 5/02* (2006.01)
*B01F 5/04* (2006.01)
*B01F 5/10* (2006.01)
*C02F 1/72* (2006.01)
*C02F 1/02* (2006.01)
*C02F 1/34* (2006.01)
*C02F 1/66* (2006.01)
*C02F 1/74* (2006.01)

(52) U.S. Cl.
CPC .......... *B01F 5/0082* (2013.01); *B01F 5/0206* (2013.01); *B01F 5/0405* (2013.01); *B01F 5/0428* (2013.01); *B01F 5/106* (2013.01); *C02F 1/72* (2013.01); *C02F 1/722* (2013.01); *C02F 1/727* (2013.01); *B01F 2003/04865* (2013.01); *B01F 2003/04879* (2013.01); *C02F 1/02* (2013.01); *C02F 1/34* (2013.01); *C02F 1/66* (2013.01); *C02F 1/74* (2013.01); *C02F 2201/003* (2013.01)

(58) Field of Classification Search
CPC ................ B01F 3/0876; B01F 3/04106; B01F 2003/04879; B01F 2003/04865; C02F 1/02; C02F 1/34; C02F 1/66; C02F 1/725; C02F 1/72; C02F 1/722; C02F 1/727; C02F 1/74
See application file for complete search history.

(56) References Cited

U.S. PATENT DOCUMENTS

| | | | |
|---|---|---|---|
| 6,139,755 A | 10/2000 | Marte et al. .................. 210/752 |
| 6,237,897 B1 | 5/2001 | Marina ........................ 261/64.1 |
| 6,969,052 B2 | 11/2005 | Korzeniowski ................ 261/76 |
| 2001/0007314 A1* | 7/2001 | Sherman ............. B01F 3/04539 210/754 |
| 2004/0113288 A1* | 6/2004 | Korzeniowski ....... B01F 3/0446 261/76 |
| 2011/0226705 A1* | 9/2011 | Dholakia .................. C02F 1/78 210/750 |
| 2011/0241230 A1* | 10/2011 | Kerfoot ............. B01D 17/0205 261/37 |

FOREIGN PATENT DOCUMENTS

| | | |
|---|---|---|
| DE | 4446375 C1 | 4/1996 |
| DE | 10302699 A1 | 9/2003 |
| EP | 1002567 A1 | 5/2000 |
| GB | 1149889 | 9/1976 |
| WO | WO9857895 | 12/1998 |

OTHER PUBLICATIONS

International Preliminary Report on Patentability with English Translation of Written Opinion in PCT/EP12/005172, Jun. 17, 2014, PCT.

* cited by examiner

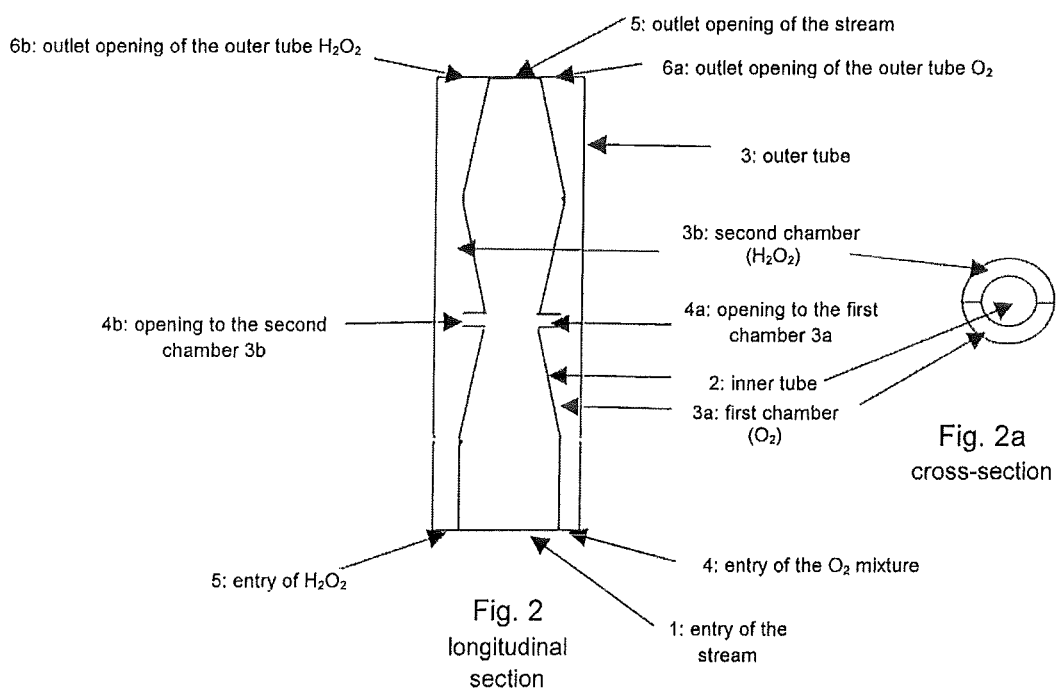
Fig. 2
longitudinal section
Fig. 2a
cross-section
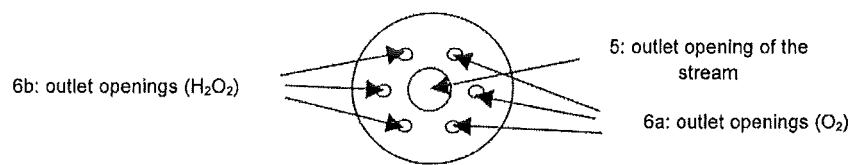
Fig. 2b
plan view

OXIDATION METHOD, NOZZLE AND SYSTEM FOR TREATING WASTE WATER

This application is the national stage under 35 U.S.C. §371 of PCT International Application No. PCT/EP2012/005172, filed Dec. 14, 2012, which claims priority from DE 10 2011 121 193.8, filed Dec. 16, 2011, the contents of which are incorporated herein by reference in their entireties.

The present invention relates to a process for the oxidation of polluted waste water as well as to a system for conducting the process and especially to a nozzle for this system.

The house-internal waste-water disposal systems for organic wastes installed today usually operate according to one of the various precipitation principles (electroflotation, flocculation with sedimentation or flotation, etc.), in the course of which in all processes undesired sludge is produced as a consequential problem. Sludge disposal is increasingly posing great difficulties because mere removal to landfills has become scarcely possible, the only available alternative then being sludge incineration. In addition, all flocculation/precipitation processes can achieve only a more or less partial decontamination of the waste water, depending on the contamination substances, which is however at the price of a very high use of chemicals which produce a very lot of sludge.

In the disposal of organic waste materials of highly polluted component flows, today sludge-free processes such as autoxidation processes (N. M. Emanuel, Z. K. Maizus, I. P. Skibida, Angew. Chem. 81, 91-101 (1969)) are therefore taking on increasing significance. Such processes are known in the chemical industry for the purpose of synthesis, but also of disposal of special refuse. Major industrial applications in disposal techniques are found in high-temperature wet incineration which are carried out at 180-280° C. with pure oxygen (H. R. Kläy, Sulzer Technical Review 4, 41-43 (1988)), such as e.g. according to the Krupp-KATOX process. A further autoxidation process performed with oxygen, which is referred to as a low-pressure process, is the Bayer "LOPROX" process (K. Holzer, Umwelt, vol. 21, 179-181 (1991)), which operates at a temperature of below 200° C. and at operating pressures of 5-20 bar.

More recent processes on the wet incineration of organic substances operate predominately at below 100° C. with hydrogen peroxide and ferrous salt, this system being known as "Fentons reagent" (F. Haber, J. Weiss, Proc. Roy. Soc. (London) A 147, 332-351 (1934); U. Sewekow, Melliand Textilberichte 1993, 153-157). To date, the processes based on pure "Fentons reagent" have not gained industrial significance because the process costs are much too high. In this case the hydrogen peroxide is the sole reagent which is used for the oxidation of the substances to be disposed.

In the patent application DE-A1-4314521 a process based on the Fentons reagent (FENTOX process) is described which is provided for the cleaning of organically polluted industrial waste water. Here, if necessary, at least a second reactor is used for the reaction process, which requires a high effort.

In the work of W. Feuerstein et al. (Vom Wasser 56, 35-54 (1981)) combinations of hydrogen peroxide and atmospheric oxygen for the oxidation of organic waste water contaminants are described in which the oxygen infused into the reaction mixture substantially accelerates the degradation.

Substantial disadvantages of known autoxidation processes for the disposal of organic waste water impurities are the high temperatures, the problems of reactor materials due to the operating temperature and the reactor principle, the unwanted dioxins which occur at the operating conditions, as well as the operating costs.

The oxidation by means of $O_2$ in the presence of $H_2O_2$ at moderate pressures and temperatures is described in WO 98/57895. However, the process described therein still has a high need of peroxide (radical starter) and salts of heavy metals. That is because the organic substance, the gas $O_2$ and the salt of the heavy metal which is dissolved in the aqueous phase have to react with each other in a complex reaction chain. Thereby, one problem is the exothermic reaction:

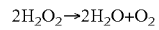

$$2H_2O_2 \rightarrow 2H_2O + O_2$$

In the presence of catalysts like platinum, manganese dioxide ($MnO_2$), $Fe^{3+}$, $I^-$, $OH^-$ or simply dust, a fast decay occurs. In addition, $H_2O_2$ reacts e.g. with salts of iron(II) according to:

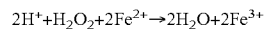

$$2H^+ + H_2O_2 + 2Fe^{2+} \rightarrow 2H_2O + 2Fe^{3+}$$

Ideally, the use of $H_2O_2$ and of Fe salts should be minimized compared to the process described in WO 98/57895.

The objective of the present invention was to provide for an oxidation process which especially overcomes the drawbacks of the process described in WO 98/57895. A further objective of the invention was to provide for a device (e.g. a nozzle) and a system for carrying out the process.

The objective is solved by the provision of a device (especially a nozzle) for the treatment of waste water (or for a system for the treatment of waste water), comprising an outer tube and an inner tube wherein the inner tube tapers (towards the center of the tube) at least once in the longitudinal direction (direction of flow) and widens again, whereby a space is formed between the outer tube and the inner tube which is separated into two chambers in the longitudinal direction and wherein the inner tube has one opening into each of both chambers at least at one constricted area and wherein the nozzle comprises a (at least partial) coating at the inner side of the inner tube, which coating comprises at least one catalyst. Alternatively or in addition, the inner tube may comprise a sintered metal at the constricted area thereof. Substances (e.g. the aqueous $H_2O_2$ solution an/or the $O_2$ containing gas) may enter the inner tube from the outer chambers through the microscopically small pores of said sintered metal.

Accordingly, the present invention relates to a device, especially a nozzle, for feeding waste water, an oxygen containing gas and a radical starter (like a radical forming oxidation agent, e.g. an aqueous $H_2O_2$ solution) into a reactor, which is characterized by an outer tube and an inner tube which inner tube forms an intermediate space with the outer tube, wherein the intermediate space between the outer tube and the inner tube is separated into at least two chambers in the longitudinal direction of the tubes (especially for the separate addition of the oxygen containing gas and the radical starter), wherein the inner tube tapers in the longitudinal direction and widens again and wherein the inner tube has at least one opening into each of both chambers at the constricted area.

Preferably, the waste water is introduced into the inner tube, the $O_2$ containing gas is introduced into one of the two chambers and a liquid containing a radical starter (e.g. an aqueous $H_2O_2$ solution) is introduced into the other chamber.

The present invention moreover relates to a device, especially a nozzle, for the treatment of waste water, comprising an outer tube and an inner tube wherein an intermediate space is formed between the outer tube and the inner tube wherein the intermediate space between the outer tube and the inner tube is separated into at least two chambers in the longitudinal direction of the tubes wherein the inner tube tapers in the longitudinal direction and widens again and wherein the inner tube has at least one opening into each of both chambers at the constricted area.

Preferred is a device as described above, wherein the intermediate space between the inner tube and the outer tube comprises at least two separating walls (bars) which proceed in the longitudinal direction and separate the intermediate space into at least two chambers.

Further preferably, the inner tube comprises a sintered metal at the constricted area thereof which has openings in the form of pores, through which substances from both chambers may enter the inner tube.

Preferably, at least one catalyst is provided at the inner side and/or within the inner tube, preferably downstream of the openings.

Moreover preferably, the device of the present invention has a coating on at least one part of the inner side of the inner tube (preferably downstream of the openings) which contains a catalyst.

Preferably, the coating comprises a priming coat of aluminum oxide (for example to enhance the adhesion of the catalyst at the inner surface).

Moreover preferably, the catalyst is selected from the following compounds/metals, which are especially present in the form of nano particles: $CuO$, $CoO$, $Ag_2O$, $Fe$, $FeSO_4$, $MnO_2$, $ZnO$, $V_2O_5$, $Pd$, $Pt$.

Further preferably, the device of the present invention has whirling means within the inner tube (e.g. changing diameters of the nozzle), which lead to strong turbulences and as a result of this to a better mixing within the nozzle. Thereby, the contact of the radical starter and the $O_2$ containing gas is further improved, so that the use of radical starter and Fe salts can be further minimized. Examples for the whirling means are horizontal assemblies within the nozzle and networks of catalysts within the nozzle.

Moreover preferably, the space between the inner tube and the outer tube is separated into two chambers which are preferably of equal size. Thereby, a uniform flow can be achieved.

Preferred dimensions of the nozzle are: diameter of the inner tube: widest area 5 to 15 mm (e.g. 11 mm), narrowest area 2 to 4 mm (e.g. 3 mm); diameter of the outer tube 20 to 40 mm (e.g. 30 mm); length of the nozzle 50 to 200 mm, preferably 80 to 120 mm (e.g. 100 mm).

Materials which are suitable for the nozzle of the present invention are e.g. stainless steels or ceramic materials like e.g. porcelain.

Further the present invention relates to a system for the treatment of organically polluted waste water comprising at least one device (nozzle) of the present invention which is described above.

Moreover the present invention relates to a process for the treatment of organically polluted waste water by the addition of a radical starter, an oxygen containing gas and optionally a catalyst (e.g. a Fe salt) in a reactor containing al least one device (nozzle) of the present invention, characterized in that the waste water is introduced into the reactor via at least one device (nozzle) of the present invention, whereby a radical starter, an oxygen containing gas and optionally a catalyst are added to the waste water in the device (nozzle).

Moreover the present invention relates to a system for carrying out the process of the present invention which comprises a device of the present invention.

The process of the present invention and the device of the present invention are preferably carries out or used, respectively, in the oxydation system described in WO 98/57895 (especially in FIG. 2 thereof).

The process of the present invention differs from the process described in WO 98/57895 especially in the following modifications of the nozzle which is used:

1. The nozzle is preferably designed as venturi nozzle (venturi tube), so that the oxygen, the radical starter and optionally the catalyst can already be mixed intensely with the waste water in the nozzle.
2. Catalytically active elements are preferably arranged within the nozzle, for example, the nozzle has preferably a coating at least at a portion of the inner side (preferably at the complete inner side) of the inner tube, which coating contains at least one catalyst, so that the oxygen is activated and the oxidation with oxygen is catalysed thereby. The nozzle may for example be coated with a priming coat ("washcoat") made from e.g. $Al_2O_3$. The catalytically active metals, noble metals or salts thereof can be embedded therein or applied thereon. Alternatively or in addition, the catalyst may also be arranged within the inner tube, e.g. in the form of a mesh or a network or on a mesh or a network, respectively. By this it can be avoided that catalyst is entering the reactor and exits therefrom together with the purified waste water. By means of this, e.g. the consumption of catalyst may be minimized.
3. The space between the outer tube and the inner tube is divided into at least two chambers, each of which have an opening towards the inner tube, so that both the radical starter (e.g. $H_2O_2$) and the $O_2$ containing gas are already intensely mixed within the nozzle.
4. The $H_2O_2$ quickly comes into contact with $O_2$ and has little contact with iron (II) salts. By means of this, the use of $H_2O_2$ and Fe salts is minimized.

This leads to the following advantages over the procedure described in WO 98/57895:
1. Less $H_2O_2$ is required;
2. lower temperatures can be used;
3. less metal catalysts are required; and
4. the reaction proceeds faster.

Figure 3:
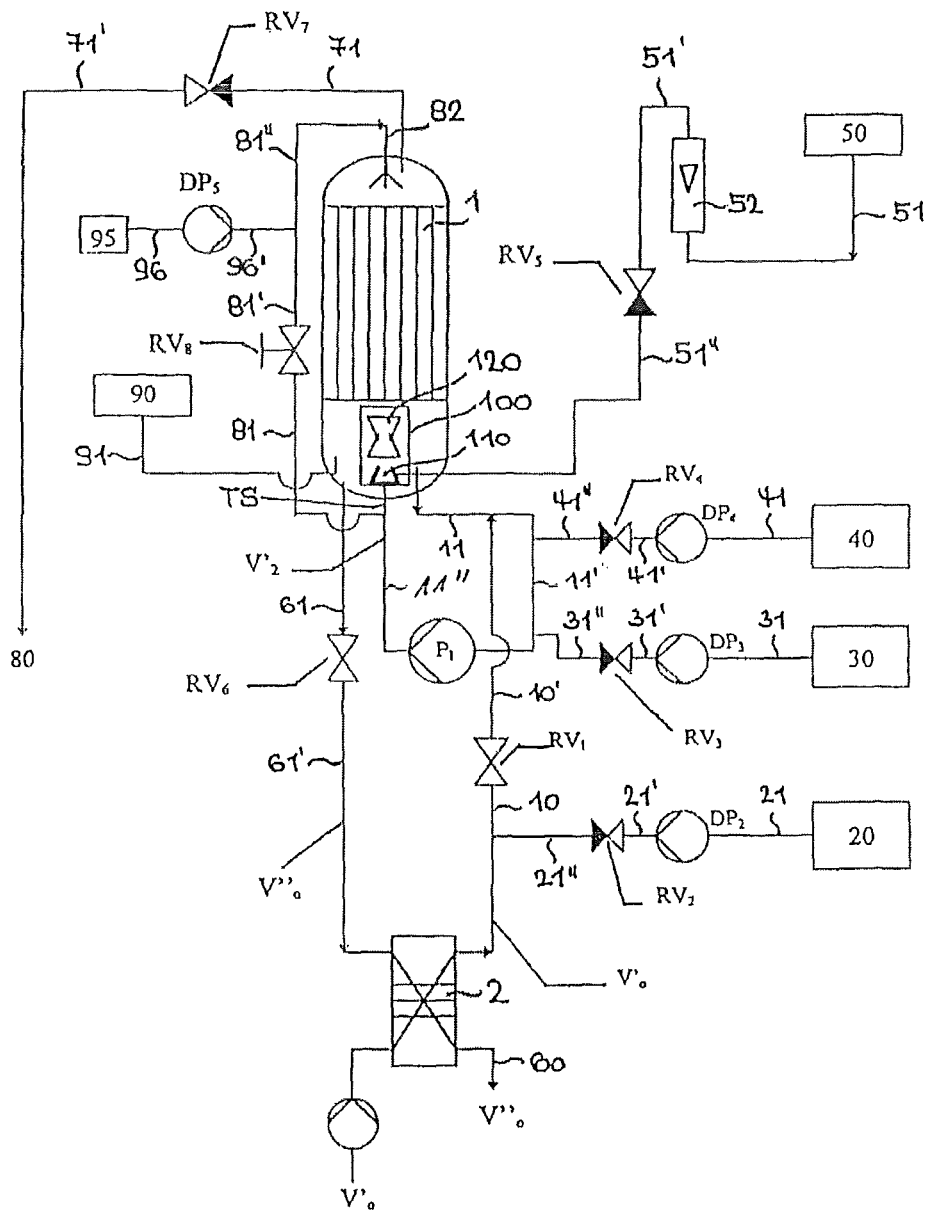

The process, the corresponding system and the nozzle are described below. the figures show:

FIG. 1 Schematic representation of radical chain reactions
FIG. 2 Side view of the nozzle
FIG. 2a Cross sectional view of the nozzle
FIG. 2b Plan view of the nozzle
FIG. 3 Schematic representation of the oxidation system (from WO 98/57895)

FIG. 1 shows a schematic representation of possible radical chain reactions on which the process is based.

The autoxidation of the organic waste water contaminants is initiated by a radical starter, or by a radical-forming oxidant. As such, compounds from the group of azo compounds such as azobisisobutyronitrile (AIBN) and azobis (cyclohexanecarbonitrile) or compounds from the group of peroxide compounds such as benzoylperoxide, di-tert-butylperoxide and hydrogen peroxide, preferably hydrogen peroxide, can be used. In FIG. 1 hydrogen peroxide is used as a representative of a radical starter or a radical-forming oxidant.

The radical chain reaction I starts by the reaction of the peroxide with the higher-valence catalyst ion in that it is transposed into a lower oxidation level with the formation of a hydroperoxide radical HOO*. The hydroperoxide radical subsequently reacts with the substrate RH(1) or with the substances contained in the waste water, thereby releasing peroxide and a carbon radical R*(1). Both species are recycled back into the circuit (I or III).

As a catalyst, salts of transition metals such as those of iron, manganese, copper, chrome and others can be used. Ferrous sulfates are preferred.

Catalyst reaction II corresponds to a reaction cycle, in the course of which the higher-valence catalyst ion is transformed by the peroxide into the lower-valance ion, and the lower-valence ion by the infused oxygen back into the higher-valence ion.

Oxygen chain reaction III starts with the infeed of a $O_2$ containing gas into the reaction mixture. The oxygen reacts on the one hand with the lower valence catalyst ion, thereby producing a hydroxy radical HO* which with the substrate RH(2) forms a carbon radical R*(2), and on the other hand with the carbon radicals R* present in the reaction mixture to form peroxide radicals ROO*. In a subsequent reaction with the substrate RH(3) the product ROOH is formed, and further carbon radicals R*(3) are released. As the $O_2$ containing gas air, oxygen/air mixtures and pure oxygen can be used. The use of air is thereby preferred.

Considered in isolation the radical chain reaction I and the catalyst reaction II form the known Fenton circuit in the event that hydrogen peroxide is used as a radical starter and a ferrous salt as the catalyst.

According to the present invention an oxygen chain reaction III is superimposed on radical chain reaction I and on catalyst reaction II, thereby producing a combination of "just-in-time" chain reactions in which the $O_2$ containing gas takes over the function of the principal oxidant. The reaction chain is maintained by the interaction of circuits I, II and III in the manner described.

The use of predominantly air as a source of oxygen has proven to be of advantage, yielding substantial cost reductions in conjunction with the consumption of overall much smaller amounts of chemicals.

In this context particular care must be taken that the ratio of radical starter to oxygen of the $O_2$ containing gas or the hydrogen peroxide/oxygen ratio, and that a specific catalyst activity are correct. Typical ratios of the substrate fractions or waste water impurities oxidized by hydrogen peroxide and oxygen are 1:5 or above, especially 1:6 or above, up to 1:10 or even 1:20. This means that up to five times the amount of the hydrogen peroxide fraction can be oxidized by the infused oxygen.

According to the procedure described in WO 98/57895 the oxygen which is delivered by the peroxide could be limited to 20% of the total oxygen required during the course of the oxidation. The process of the present invention makes it possible to limit the amount of peroxide to 5% or less. The rest is oxidized by gaseous oxygen.

Such high turnover rates are made possible by using the nozzle of the present invention.

Alternatively, the nozzle of the present invention makes it also possible to work without metal salts in solution if the nozzle has a coating containing at least one catalyst on the inner side of the inner tube.

FIGS. 2, 2*a* and 2*b* show an embodiment of the nozzle of the present invention in side view (longitudinal section), in cross section view and in plan view. The nozzle is preferably constructed rotationally symmetric. A representation of the connection elements and the fastening elements has been dispensed. The stream of waste enters the inner tube 2 of the nozzle through opening 1. The inner tube tapers and widens again providing a tapered portion and a widening portion, with a constricted area between the tapered portion and the widening portion. The space between the outer tube and the inner tube is divided in two parts by at least two separating walls, extending radially and in a longitudinal direction between the inner tube 2 and the outer tube 3. The $O_2$ containing gas is introduced into chamber 3*a*. The radical starter (e.g. $H_2O_2$) is introduced into chamber 3*b*. At the constriction area of the tube there is an opening 4*a* to chamber 3*a* and an opening 4*b* to chamber 3*b*. According to the principle of the venturi tube the $O_2$ containing gas and the radical starter (e.g. $H_2O_2$) enter the inner tube at least partially.

The head of the nozzle has e.g. 6 bores (6*a*, 6*b*) which are arranged around the outlet opening 5 of the inner tube. By means of this, for example, that part of the gases which has not entered the waste water through opening 4*a* is infused in a finely disperse form into the stream when entering the reactor in order to ensure a maximum exchange of substances between the gas bubbles and the surrounding fluid. Furthermore e.g. that part of the $H_2O_2$ solution which has not entered the waste water through opening 4*b* is infused into the stream when entering the reactor.

As already described above, the device (nozzle) of the present invention may be part of a nozzle system as e.g. described in WO 98/57895. Preferably the device (nozzle) of the present invention is used as motive jet nozzle in the procedure described in WO 98/895. Further the device (nozzle) of the present invention is preferably used in an oxidation system as described in WO 98/57895.

FIG. 3 shows an exemplified schematic representation of an oxidation system as described in WO 98/57895.

The water flow contaminated with organic impurities V'$_0$ or the waste water flow, respectively, which has been preheated in a heat exchanger 2 to a temperature difference of 5-20° C. relative to the reaction temperature, is fed via pipe 10, a control valve $RV_1$, a pipe 10' to the reactor circulation flow V'$_2$ consisting of the pipes 11, 11' and 11" in the intake section of pump $P_1$. Pipe 11 connects a discharge branch of a reactor 1 with the intake of pump $P_1$, and pipe 11" the discharge branch of pump $P_1$ with a nozzle system 100 which is arranged in the lower part of the reactor and which comprises at least one nozzle 110 according to the present invention. The circulation flow recirculation ratio is e.g. 1:0 to 1:20.

Acid or alkaline 20 is fed into the system via an apportioning circuit with apportioning pump $DP_2$, apportioning valve $RV_2$ and pipes 21, 21' and 21" and discharges into pipe 10.

A radical starter 30 is fed into the system via an apportioning circuit with apportioning pump $DP_3$, apportioning valve $RV_3$ and pipes 31, 31' and 31" and discharges into pipe 11'.

A catalyst 40 is fed into the system via an apportioning circuit with apportioning pump $DP_4$, apportioning valve $RV_4$ and pipes 41, 41' and 41" and discharges into pipe 11'.

The circulation pump $P_1$ serves both as a mixing device for the chemicals apportioned into the system, and also for the generation of a stream TS in connection with nozzle system 100 comprising at least one nozzle according to the present invention.

An $O_2$ containing gas 50 is fed to the nozzle of the present invention 110 via a flowmeter 52, an apportioning valve $RV_5$ and pipes 51, 51' and 51".

The outlet flow V'''$_0$ out of the reactor passes via a control valve $RV_6$, the heat exchanger 2 and pipes 61 and 61'. The reactor is vented 80 via a control valve RV$_7$ and pipes 71 and 71'. A heater 90 supplies the reactor with the energy necessary for the starting conditions via pipe 91.

From pipe 11" part of the circulation flow is fed via control valve RV$_8$ and pipes 81, 81' and 81", which are also referred to as "shower pipes", to a spraying device 82 located in the upper part of the reactor and which is used, amongst other purposes, to combat foam. Additives 95 for microdispersion initialization and stabilization are also provided which are fed into the pipe 81" or the spraying device 82, respectively, via an apportioning pump DP$_5$ and pipes 96 and 96'.

The shower pipes 81, 81' and 81" are also supplied by the circulation pump P$_1$, and the flow is regulated by valve RV$_8$. The gas mixture, which is low in oxygen, leaves the reactor via pipes 71 and 71' and control valve RV$_7$. If necessary, the heat-up energy required in the startup phase can be provided by an electrical heater installed in the reactor.

The present invention moreover relates to a process for the continuous operation of a system for the treatment of organically polluted waste water in a reactor, optionally with an upstream heat exchanger and with at least one device (nozzle) of the present invention, by the addition of a radical starter, an O$_2$ containing gas and optionally a catalyst wherein the waste water is optionally preheated in a heat exchanger and subsequently introduced as a stream into the reactor through at least one device (nozzle) of the present invention, wherein a radical starter and optionally a catalyst are added to the stream and wherein an O$_2$ containing gas is added to the stream in the device (nozzle). Thereby an unstationary flow can optionally be produced and a radical chain reaction can be started and maintained. In this chain reaction a superimposition of the radical chain reaction initiated by the radical starter and of the O$_2$ chain reaction initiated by the O$_2$ containing gas occurs, as a result of which the catalyst cyclically changes its valence and wherein the degradation of the ingredients of the waste water to be oxidized is thereby effected.

The reactor pressure range is preferably 0 to 4 bars, especially preferably 1 to 3 bars. The temperature range is preferably 80 to 140° C., especially preferably approx. 110° C. Possible materials for the reactor are e.g. V4A steels. Microdispersion stabilization may e.g. be achieved by the addition of a low-foam surfactant or by a polyether mixture, e.g. a polyethylene/polypropylene oxide copolymerisate. At the same time the height of the bubble column is kept as low as possible to facilitate degassing of the water. The infusion of the polyether can also be done into the reactor circulation flow. If necessary, the heat-up energy required in the startup phase can be provided by an electrical heater installed in the reactor.

EXAMPLE

The process was carried out in an oxidation system as shown in FIG. 3: A 4 l reactor which was equipped with a nozzle according to the present invention, a mammoth tube as well as measurement and control technology is charged with 3 l of a 30% aqueous potassium hydrogenphthalate solution (waste water) and 0.2 g of iron sulfate (FeSO$_4$*7H$_2$O). This corresponds to a chemical need of oxygen (CSB) of approx. 12,000 mg O$_2$ per liter. The pH is adjusted to 3 and the mixture is heated to 120° C. As soon as 120° C. are reached, 2.5 g of a 35% hydrogen peroxide solution are added over 20 minutes via the nozzle. Simultaneously, an air stream of a total of 22 l air are added over 20 minutes via the nozzle. The pH is maintained at 3. This leads to a reduction of the CSB of 85%.

The invention claimed is:

1. A device for feeding waste water, an oxygen containing gas and a radical starter into a reactor, which is characterized by an outer tube (3) and an inner tube (2) which inner tube forms an intermediate space with the outer tube, wherein the intermediate space between the outer tube and the inner tube comprises at least two separating walls, extending radially and in a longitudinal direction between the inner tube and the outer tube, separating the intermediate space into at least two chambers (3a, 3b), wherein the inner tube comprises a tapered portion and a widening portion in the longitudinal direction, wherein the inner tube has at least one opening (4a, 4b) at a constricted area, between the tapered portion and the widening portion in the longitudinal direction, that opens into each of the at least two chambers (3a, 3b), and wherein at least one catalyst is provided at an inner side of the device or at the inner tube.

2. A device for treatment of waste water, comprising an outer tube (3) and an inner tube (2) wherein an intermediate space is formed between the outer tube and the inner tube wherein the intermediate space between the outer tube and the inner tube comprises at least two separating walls, extending radially and in a longitudinal direction between the inner tube and the outer tube, separating the intermediate space into at least two chambers (3a, 3b) wherein the inner tube comprises a tapered portion and a widening portion in the longitudinal direction, wherein the inner tube has at least one opening (4a, 4b) at a constricted area, between the tapered area and the widening area in the longitudinal direction, that opens into each of the at least two chambers (3a, 3b), and wherein at least one catalyst is provided at an inner side of the device or at the inner tube.

3. A device according to claim 1 or 2, characterized in that the inner tube comprises a sintered metal at the constricted area thereof which has openings (4a, 4b) in the form of pores, through which substances from both chambers (3a, 3b) may enter the inner tube.

4. A device according to claim 1 or 2, characterized in that it has a coating containing at least one catalyst on at least one part of the inner side of the inner tube.

5. A device according to claim 4, characterized in that the coating comprises a priming coat of aluminum oxide.

6. A device according to claim 4, characterized in that the catalyst is selected from the following compounds/metals: CuO, CoO, Ag$_2$O, Fe, FeSO$_4$, MnO$_2$, ZnO, V$_2$O$_5$, Pd, Pt.

7. A device according to claim 6, characterized in that the compounds/metals are present in the form of nano particles.

8. A device according to claim 1 or 2, characterized in that each of the at least two chambers are of approximately equal size.

9. A device according to claim 1 or 2, wherein said device is a nozzle.

10. A process for the treatment of organically polluted waste water by the addition of a radical starter and an oxygen containing gas in a reactor containing at least one device according to claim 1 or 2, characterized in that the waste water is introduced into the reactor via the at least one device, whereby the radical starter and the oxygen containing gas are added to the waste water in the device.

11. A nozzle system for a system for the treatment of organically polluted waste water comprising at least one device according to claim 1 or 2.

12. A process for the treatment of organically polluted wastewater by the addition of a radical starter and an oxygen containing gas in a reactor containing at least one nozzle system according to claim 11, characterized in that the waste water is introduced into the reactor via at least one nozzle system according to claim 11, whereby the radical starter and the oxygen containing gas are added to the waste water in the nozzle system.

\* \* \* \* \*